United States Patent [19]

Marrion et al.

[11] 4,452,948

[45] Jun. 5, 1984

[54] COATING COMPOSITION COMPRISING A HYDROXY COMPONENT, AN ANHYDRIDE COMPONENT AND A CATALYST

[75] Inventors: Alistair R. Marrion, Hollywood; Susan Roy, Warwick; Frank E. Rowe, Warley, all of England

[73] Assignee: The International Paint Company Limited, London, England

[21] Appl. No.: 298,387

[22] Filed: Sep. 1, 1981

[30] Foreign Application Priority Data

Sept. 10, 1980 [GB] United Kingdom ............. 8029202

[51] Int. Cl.$^3$ .............................................. C08F 20/08
[52] U.S. Cl. .................... 525/207; 427/385.5; 427/386; 427/388.2; 525/223
[58] Field of Search .................. 427/385.5, 386, 388.2; 525/207, 194, 223, 380

[56] References Cited

U.S. PATENT DOCUMENTS

| | | | |
|---|---|---|---|
| 3,972,961 | 8/1976 | Hammer et al. | 525/207 X |
| 4,069,275 | 1/1978 | Labana et al. | 525/207 |
| 4,101,606 | 7/1978 | Cenci et al. | 525/207 X |
| 4,145,513 | 3/1979 | Dalibor | 528/75 |
| 4,163,739 | 8/1979 | Dalibor | 526/75 X |
| 4,177,183 | 12/1979 | Dalibor | 525/329 X |
| 4,308,188 | 12/1981 | Wicks et al. | 525/380 |

FOREIGN PATENT DOCUMENTS

| | | |
|---|---|---|
| 851106 | 4/1976 | Belgium . |
| 851792 | 4/1976 | Belgium . |
| 851788 | 6/1976 | Belgium . |
| 2392092 | 5/1978 | France . |
| 1417252 | 10/1973 | United Kingdom . |
| 1583316 | 1/1981 | United Kingdom . |

*Primary Examiner*—Thurman K. Page
*Attorney, Agent, or Firm*—Steele, Gould & Fried

[57] ABSTRACT

A coating composition comprises a hydroxy component having at least two free hydroxyl groups per molecule and an anhydride component which is a polymer-containing cyclic carboxylic acid anhydride groups derived from an olefinically unsaturated cyclic carboxylic acid anhydride, the two components being packaged separately during storage of the composition and being compatible on mixing. At least one of the components is a film-forming polymer. The composition includes a catalytically effective amount of amine groups for accelerating the curing reaction between the hydroxyl groups and the anhydride groups. The amine groups are present in the molecule of the hydroxy component or in a separate amine compound. The hydroxy component is preferably a film-forming acrylic copolymer having pendent hydroxyl and dialkyl-amino-alkyl groups. The composition is particularly useful as a glossy pigmented coating for rigid substrates such as vehicle bodies where hardening of the coating at ambient temperature is required.

12 Claims, No Drawings

COATING COMPOSITION COMPRISING A HYDROXY COMPONENT, AN ANHYDRIDE COMPONENT AND A CATALYST

This invention relates to a coating composition suitable for use as a glossy pigmented coating for a rigid substrate, particularly where hardening of the coating at ambient temperatures is required.

Known products for this purpose include two-package paints based on an acrylic polymer containing hydroxyl groups and a curing agent containing isocyanate groups, but precautions have to be taken in the use of toxic isocyanates. Such precautions can be difficult to achieve since the requirement for ambient temperature hardening is most common when articles are not being painted under factory conditions. There is a requirement for an ambient temperature hardening coating which does not use isocyanate curing agents.

For example ambient temperature hardening is required when fully or partially repainting articles, for example vehicles. The most widely used paints for vehicle repainting are solvent-based cellulose ester paints, which have the disadvantage of low solids content, leading to a high wastage of expensive solvent, pollution of the atmosphere by solvent during drying and the requirement for multiple coats to achieve the required film thickness. A paint for this purpose should be capable of curing at ambient temperature to a hard glossy film which is resistant to solvent so that it can be overcoated within 24 hours, preferably within 16 hours. The paint should not, however, set so rapidly that it is difficult to form a smooth film. The resin used in the paint should preferably be colourless so that it can be pigmented to match the colour of an article to be repainted and should have a viscosity suitable for application by spraying without undue dilution. When the paint is to be used to coat motor vehicles the cured paint film should be resistant to petrol and moisture.

Other uses where ambient temperature hardening is required are for paint used in ships, for example for painting ships' internal holds, where the coated film should preferably be hard and resistant to abrasion and impact, and for paint used on yachts and pleasure boats.

When the coating composition is a two-package paint it should preferably have a pot life of at least 2 hours after mixing. The separate packages of the paint should preferably have a long shelf life, for example at least 1 year.

According to the invention, a coating composition which includes a film-forming polymer and comprises (a) a hydroxy component having at least two free hydroxyl groups per molecule, (b) an anhydride component having at least two cyclic carboxylic acid anhydride groups per molecule, and (c) a catalytically effective amount of amine groups for accelerating the curing reaction between the hydroxyl groups of (a) and the anhydride groups of (b), the components (a) and (b) being packaged separately during storage of the composition, is characterised in that the anhydride component (b) is a polymer containing cyclic carboxylic acid anhydride groups derived from an olefinically unsaturated cyclic carboxylic acid anhydride and is compatible with component (a) on mixing. The amine groups (c) may be present in the molecule of the hydroxy component (a) or in a separate amine compound, and either component (a) or component (b) or both may be a film-forming polymer.

French Pat. No. 2,392,092 describes a coating composition containing a hydroxyl-containing polymer and an ester anhydride containing at least two anhydride groups, but the anhydride used is an oligomer of trimellitic anhydride which is not soluble in a common solvent, i.e. not compatible, with the hydroxy polymer. The composition of French Pat. No. 2,392,092 includes as catalyst a paste of an aluminium or titanium compound, without which the anhydride is said to be insufficiently reactive. French Pat. No. 2,392,092 mentions the addition of an amine hardening catalyst, but not the use of amine groups in the molecule of the hydroxy polymer.

In the coating composition of the present invention, the hydroxy component (a) is preferably a film-forming polymer, for example a film-forming copolymer of an olefinically unsaturated monomer containing one or more free hydroxyl groups with at least one olefinically unsaturated comonomer or another addition copolymer having pendent hydroxyl groups. The copolymer (a) is preferably an ester resin such as an acrylic resin, for example a copolymer of 10 to 80 percent by weight, preferably 15 to 50 percent by weight, of a hydroxyl-containing ester of an olefinically unsaturated carboxylic acid, the balance of the copolymer being units of at least one olefinically unsaturated comonomer. The hydroxyl-containing ester is preferably an acrylate or methacrylate, for example a hydroxy-alkyl acrylate or methacrylate such as hydroxy-ethyl acrylate, hydroxy-ethyl methacrylate, hydroxy-propyl methacrylate or hydroxy-propyl acrylate, and may contain ether or further ester linkages, for example 2-($\beta$-hydroxy-ethoxy)ethyl acrylate or methacrylate. Examples of olefinically unsaturated monomers which can be copolymerised with the hydroxyl-containing ester are acrylic esters such as butyl acrylate, methyl methacrylate, butyl methacrylate, ethyl acrylate, propyl acrylate, hexyl acrylate and hexyl methacrylate, and vinyl compounds such as styrene, vinyl acetate and vinyl chloride.

The ester resin can also be a copolymer containing a polyester segment, for example a graft copolymer of acrylic monomers onto an unsaturated polyester. The acrylic monomers are preferably selected from those above and include a hydroxyl-containing monomer such as a hydroxy-alkyl acrylate or methacrylate. The polyester segment is preferably a low molecular weight (below 1000) polyester derived from a polyol such as ethylene glycol, propylene glycol or trimethylolpropane and an acid or anhydride such as phthalic anhydride, isophthalic acid or adipic acid with a minor amount of an unsaturated acid or anhydride such as maleic anhydride. The polyester generally forms 50% or less by weight of the graft copolymer, for example 5–25% by weight. Coatings made from an acrylic copolymer containing a polyester segment may have improved gloss, flow and appearance after spraying but are generally not so resistant to hydrolysis as coatings based on polymers formed only by addition polymerisation.

An alternative method of preparing an addition copolymer having pendent hydroxyl groups is to prepare a copolymer having amide groups, for example acrylamide or methacrylamide units, and to form N-methylol groups on the amide by reaction with formaldehyde.

The hydroxy component (a) can alternatively be a copolymer of allyl alcohol, for example a styrene/allyl alcohol copolymer optionally containing allyl ether units.

The amine groups present as catalysts are preferably tertiary amine groups since these are most effective in catalysing the reaction between the hydroxyl and anhydride groups without taking part in any undesirable side reactions. Most preferably the amine groups are present in the hydroxy component (a), for example as pendant groups in a hydroxyl-containing copolymer. Such a copolymer can for example contain 2 to 50 percent by weight of units of a dialkyl-amino-alkyl acrylate or methacrylate, for example diethyl-amino-ethyl methacrylate or dimethyl-amino-ethyl methacrylate or of a dialkyl-amino-alkyl-substituted amide such as dimethyl-amino-propyl methacrylamide. Units of a secondary amine such as t-butyl-amino-ethyl methacrylate can be used. One example of a preferred copolymer containing hydroxyl groups and tertiary amine groups is a copolymer of (by weight) 30 percent hydroxy-ethyl acrylate, 30 percent butyl acrylate, 30 percent methyl methacrylate and 10 percent diethyl-amino-ethyl methacrylate. Alternatively, tertiary amine groups can be introduced into an acrylic resin by copolymerising glycidyl acrylate or methacrylate with the hydroxyl-containing monomer and the unsaturated comonomer(s) and subsequently reacting the glycidyl groups with a secondary amine.

The use of amine groups present in the molecule of the hydroxy component has several advantages over the use of a separate amine compound as catalyst. Such bound amine groups are more effective in promoting curing and are less likely to lead to moisture sensitivity in the hardened coating or to side reactions causing premature gelation. Moreover, bound amine groups are less hazardous to health than low molecular weight amines.

The anhydride component (b) is preferably an addition polymer of an unsaturated cyclic anhydride, for example maleic, citraconic, itaconic or aticonic anhydride, usually a copolymer with one or more ethylenically unsaturated comonomers. Esters of acrylic or methacrylic acid such as butyl acrylate, ethyl acrylate, methyl methacrylate or butyl methacrylate preferably form at least part of the comonomers. Styrene is frequently used as a comonomer although it preferably forms no more than 50% by weight of the comonomers. The copolymers of maleic, citraconic or itaconic anhydride with acrylic esters have the advantage of excellent miscibility with hydroxyl-containing acrylic polymers (a) and give a hard glossy cured coating. Preferred copolymers contain 10 to 50 percent by weight maleic or itaconic anhydride units when the hydroxy component is an acrylic copolymer, for example a copolymer of (by weight) 20 percent maleic or itaconic anhydride, 40 percent butyl acrylate and 40 percent methyl methacrylate. Itaconic anhydride copolymers may be preferred as giving more rapid curing of the coating after application together with a long pot life but maleic anhydride copolymers are also satisfactory and may be preferred as less expensive.

The anhydride component (b) can alternatively be an anhydride adduct of a diene polymer such as maleinised polybutadiene or a maleinised copolymer of butadiene, for example a butadiene/styrene copolymer. Maleinised polymers of this type have the advantage of high reactivity with hydroxyl-containing copolymers (a) to give a glossy coating, although the coating is not as hard as the coatings formed from the above anhydride copolymers. An anhydride adduct of an unsaturated fatty acid ester, for example a styrene allyl alcohol copolymer esterified with an unsaturated fatty acid and maleinised, can also be used.

Coating compositions according to the invention can be produced in which the anhydride component (b) is a film-forming copolymer and the hydroxy component (a) is of low molecular weight (for example below 500) and not film-forming. For example a copolymer of maleic or itaconic anhydride with one or more acrylic esters and optionally styrene can be hardened using a tertiary amino polyol such as triethanolamine, 2-hydroxymethyl-2-dimethylamino-1,3-propanediol or 2-hydroxymethyl-2-dimethylamino-1-propanol. In this case the anhydride copolymer preferably contains less anhydride than when using a hydroxyl-containing acrylic polymer, for example 2-10% by weight maleic anhydride units.

The hydroxy component can also be a polymer formed from such a tertiary amino polyol, for example a polyester formed by extending triethanolamine with caprolactone such as that sold under the trade name 'Capa 790068'. This is preferably used with an anhydride copolymer designed to give a hard film, for example a copolymer of 15% by weight itaconic anhydride with 85% methyl methacrylate. Other polyesters containing free hydroxyl groups can be used provided they are compatible with the anhydride polymer. Compatible epoxy resins containing free hydroxyl groups can also be used. Both hydroxyl and tertiary amine groups can be introduced into an epoxy resin by reacting it with diethanolamine. Examples of epoxy resins are aliphatic or cycloaliphatic polyethers with epoxy end groups such as 'Dow DER 736' and 'Epindex' resins.

The hydroxy component (a) can be a mixture of a polymer containing hydroxyl but not amine groups with a polymer or compound containing hydroxyl and amine groups or the amine catalyst can be a separate amine compound not containing hydroxyl groups. Examples of amine catalysts which are not bound to the hydroxyl-containing polymer are phenolic compounds containing at least two dialkyl-amino substituents.

The amount of hydroxy component (a) used in the coating composition should generally be such that it contains a number of hydroxyl groups at least equivalent to the number of anhydride groups in component (b) since unreacted anhydride groups can lead to a coating of reduced resistance to water. An excess of hydroxyl groups is generally preferred, for example a hydroxyl-containing acrylic polymer can be used at 1.1 to 3 times, preferably about twice, the amount equivalent to the anhydride groups in the anhydride component.

The hydroxy component (a) and the anhydride component (b) are both preferably dissolved in a solvent mixture of a hydrocarbon and a polar organic solvent, for example xylene with an ester such as ethyl or butyl acetate or a ketone such as methyl ethyl ketone or methyl isobutyl ketone or an ether. In most cases, the coating composition contains additives such as pigments or fillers. In the preferred compositions where the hydroxy component (a) is a film-forming polymer these are preferably included in the hydroxy polymer component of the paint.

The invention is illustrated by the following Examples in which percentages are by weight.

EXAMPLE 1

Preparation of Hydroxy-acrylic resin 700 g xylene was heated to reflux in a 2-liter flask. A mixture of 249 g hydroxy-ethyl acrylate, 215.5 g styrene, 215.5 g butyl acrylate, 215.5 g methyl methacrylate, 80.55 g glycidyl methacrylate and 21 g azodiisobutyronitrile (AZDN) was added at a steady rate over 3 hours. After holding the mixture for 1 hour at reflux a further 4.2 g AZDN was added and the mixture was held at reflux until a solids content of 59 percent was obtained. 73.15 g dibutylamine was added slowly to the mixture which was held at reflux for a further hour to allow the dibutylamine to react with the glycidyl groups to introduce amine and hydroxyl groups. The polymer obtained had a hydroxyl equivalent of 2.48 meq. per g and an amine content of 0.54 meq. per g.

Preparation of Anhydride Copolymer 112.5 g maleic anhydride, dissolved in 450 g xylene, was heated to reflux in a 2-liter flask. A mixture of 450 g butyl acrylate, 450 g methyl methacrylate, 112.5 g maleic anhydride and 25.6 g p-tert.-butyl perbenzoate was added at a steady rate over a period of three hours. After completion of the monomer addition, the mixture was held at reflux for 15 minutes and then a mixture of 5 g p-tert.-butyl perbenzoate and 45 g xylene was added over 45 minutes. Finally the mixture was held at reflux for a further 2 hours. The resulting polymer had a solids content of 70 percent and an acid value of 110 mg.KOH per g (as measured after methanolysis).

Paint Formulation 96 g of the hydroxy-acrylic resin solution obtained as described above (at 60 percent solids) was mixed with 267.5 g titanium dioxide and 30 g butyl acetate on a high speed disperser. This was mixed with a further 52 g of the resin solution and 30 g butyl acetate in a sand-mill to a particle size of >7.5 NS (Hegman scale). The paint was thinned with 469 of the resin solution and 75 g butyl acetate to provide the first component of the paint composition.

The anhydride curing agent solution obtained as described above (at 70 percent solids) was used as the second component of the paint composition and was mixed with the first component so that the ratio of hydroxyl groups in the hydroxy-acrylic resin to anhydride groups in the curing agent was 2:1. The resulting composition had a pot life of 8 hours. It was sprayed onto steel panels at a dry film thickness of 50 microns. The wet edge time of the coating (the time within which the edge of the coated area where spraying commenced could be covered by further spraying of the paint composition so that the edge could not be detected) was about 2 hours. The paint film obtained dried overnight (16 hours) to give a hard glossy white film resistant to hydrocarbon solvents and to moisture.

EXAMPLE 2

Preparation of Hydroxy-acrylic Resin 700 g xylene was heated to reflux in a 2-liter flask. A mixture of 315 g hydroxy-ethyl acrylate, 105 g diethylamino-ethyl methacrylate, 210 g styrene, 210 g butyl acrylate, 210 g methyl methacrylate and 21 g azodiisobutyronitrile (AZDN) were added at a steady rate over a period of 3 hours. After holding for 1 hour at reflux a further 4.2 g AZDN was added and the mixture was held at reflux until a solids content of 60 percent was obtained. The polymer obtained had a hydroxyl equivalent of 2.48 meq. per g and an amine content of 0.54 meq. per g.

Preparation of Anhydride Curing Agent 495 g xylene was heated to reflux in a 2-liter flask. A mixture of 281.25 g itaconic anhydride, 562.5 g butyl acrylate, 181.25 g methyl methacrylate and 59.2 g p-tert.-butyl perbenzoate was added at a steady rate over 3 hours. After holding the mixture at reflux for 1 hour 5 g p-tert.-butyl perbenzoate was added and the mixture held for a further 2 hours at reflux until a solids content of 70 percent was obtained. The polymer obtained had an acid value of 125 meq. KOH per g (as measured after methanolysis).

Paint Formulation

The 60 percent solids solution of the hydroxy-acrylic resin obtained as described above was compounded with TiO$_2$ and butyl acetate solvent as described in Example 1 and in a similar manner with a filler to provide the first component of the paint composition. The 70 percent solids solution of the anhydride curing agent was used as the second component of the paint composition and was mixed with the first component so that the ratio of hydroxyl groups in the hydroxy-acrylic resin to anhydride groups in the curing agent was 2:1.

The resulting paint composition had properties very similar to the paint of Example 1 both in terms of pot life of the paint composition and of the properties of the film applied by spraying.

Good paints can also be prepared using the hydroxy-acrylic resin of Example 1 with the anhydride curing agent of Example 2 or the hydroxy acrylic resin of Example 2 with the anhydride curing agent of Example 1.

EXAMPLE 3

500 g butyl acetate was heated to reflux in a bolthead flask fitted with multinecked lid, stirrer, reflux condenser and thermometer. Styrene (320 g), methyl methacrylate (275 g), butyl acrylate (340 g), maleic anhydride (40 g), and para-tertiary-butyl perbenzoate (25 g) were premixed and run into the flask over 4 hours. 1 hour after addition was complete a further 5 g portion of p-tert.-butyl perbenzoate was added, and the mixture held at reflux for 2 hours. The final non-volatile content was 75 percent.

100 g of the resulting resin was mixed with 4 g of triethanolamine, thinned with 20 g of 2-ethoxyethyl acetate and spray-applied to mild steel panels.

The coating cured overnight at 5° C. to a hard, glossy, solvent resisting lacquer.

EXAMPLE 4

1074 g propylene glycol, 640 g trimethylolpropane and 2091 g phthalic anhydride were reacted at 250° C. to form a polyester of acid value 10. 161.2 g maleic anhydride was added at 100° C. and reacted for 1 hour to introduce ethylenic unsaturation into the polyester. The product was thinned to 70% solids with butyl acetate.

528 g of the resulting polyester solution and 486 g butyl acetate were heated to reflux. 225 g hydroxy-ethyl acrylate, 150 g diethylaminoethyl methacrylate, 281.3 g styrene, 187.5 butyl acrylate, 281.3 g methyl methacrylate and 37.5 g azobisisobutyronitrile were premixed and added to the polyester solution over 3 hours. Reflux was continued for 3 hours with two additions each of 3.75 g azobisisobutyronitrile being made at hourly intervals. A 70% solids solution of a hydroxy-acrylic polymer was produced in which the acrylic monomers were grafted onto the polyester which formed about 25% of the final hydroxy-acrylic polymer.

This hydroxy-acrylic resin solution was pigmented and thinned as described in Example 1 to provide the first component of a paint composition. The second component of the paint composition was the anhydride copolymer described in Example 1. The two components of the paint composition were mixed in proportion to give a ratio of hydroxyl groups derived from hydroxy-ethyl acrylate to anhydride groups derived from maleic anhydride of 1:1. The paint composition was sprayed onto steel panels at a dry film thickness of 50 microns to produce a hard white film of excellent gloss.

What is claimed is:

1. A coating composition comprising
   (a) a hydroxy component and,
   (b) an anhydride component,
   in which the hydroxy component (a) is a film-forming polymer having at least two free hydroxyl groups per molecule, and also has in its molecule a catalytically effective amount of amine groups for accelerating the curing reaction between the hydroxyl groups of (a) and the anhydride groups of (b), and,
   the anhydride component (b) is a polymer having at least two cyclic carboxylic acid anhydride groups per molecule and is derived from an olefinically unsaturated cyclic carboxylic acid anhydride,
   the components (a) and (b) being compatible on mixing.

2. A coating composition according to claim 1 in which the hydroxy component (a) is a film-forming copolymer of an olefinically unsaturated monomer containing at least one free hydroxyl group with at least one olefinically unsaturated comonomer.

3. A coating composition according to claim 2 in which the hydroxyl component (a) is a copolymer of 10 to 80 percent by weight of a hydroxyl-containing ester of an olefinically unsaturated carboxylic acid, the balance of the copolymer being units of at least one olefinically unsaturated comonomer.

4. A coating composition according to claim 1 in which the amine groups for accelerating the curing reaction between the hydroxyl groups of (a) and the anhydride groups of (b) are tertiary amine groups.

5. A coating composition according to claim 1 in which the hydroxy component (a) is an addition polymer containing 2 to 50 percent by weight of units of a dialkylamino-alkyl acrylate or methacrylate.

6. A coating composition according to claim 2 in which the anhydride component is an addition copolymer of an unsaturated cyclic anhydride with at least one ethylenically unsaturated comonomer.

7. A coating composition according to claim 6 in which at least part of the comonomer in the addition copolymer is an ester of acrylic or methacrylic acid.

8. A coating composition according to claim 6 in which the hydroxy component (a) is an addition polymer having pendent hydroxyl groups and the anhydride component (b) is a copolymer containing 10 to 50 percent by weight itaconic anhydride units.

9. A coating composition according to claim 6 in which the hydroxy component (a) is an addition polymer having pendent hydroxyl groups and the anhydride component (b) is a copolymer containing 10 to 50 percent by weight maleic anhydride units.

10. A coating composition according to claim 6 in which the anhydride component (b) is a copolymer of maleic or itaconic anhydride with at least one acrylic ester and optionally styrene, and the hydroxy component (a) is a lower molecular weight hydroxy compound which is not film-forming.

11. A coating composition comprising
    (a) a hydroxy component and,
    (b) an anhydride component,
    in which the hydroxy component has at least two free hydroxyl groups per molecule, and also has in its molecule a catalytically effective amount of tertiary amine groups for accelerating the curing reaction between the hydroxyl groups of (a) and the anhydride groups of (b), and,
    the anhydride component (b) is a polymer having at least two cyclic carboxylic acid anhydride groups per molecule and is derived from an olefinically unsaturated cyclic carboxylic acid anhydride,
    the components (a) and (b) being compatible on mixing.

12. A coating composition according to claim 11 in which the anhydride component is an addition copolymer of an unsaturated cyclic anhydride with at least one ethylenically unsaturated comonomer.

* * * * *